United States Patent [19]

Diehl et al.

[11] Patent Number: 5,461,675
[45] Date of Patent: Oct. 24, 1995

[54] APPARATUS AND METHOD FOR ACCESS CONTROL

[75] Inventors: Eric Diehl, Strasbourg; David Naccache, Maisons-Alfort, both of France

[73] Assignee: Thomson Consumer Electronics S.A., Courbevoie, France

[21] Appl. No.: 121,599

[22] Filed: Sep. 14, 1993

[30] Foreign Application Priority Data

Sep. 14, 1992 [EP] European Pat. Off. .............. 92402503

[51] Int. Cl.$^6$ ............................ H04L 9/32; H04L 7/167
[52] U.S. Cl. ................... 380/23; 380/16; 235/380
[58] Field of Search ...................... 380/16, 23; 235/380

[56] References Cited

U.S. PATENT DOCUMENTS

| | | | |
|---|---|---|---|
| 4,944,008 | 7/1990 | Piosenka et al. | 380/46 |
| 5,056,140 | 10/1991 | Kimbell | 380/23 |
| 5,208,856 | 5/1993 | Leduc et al. | 380/20 X |

FOREIGN PATENT DOCUMENTS

| | | | |
|---|---|---|---|
| 428252 | 5/1991 | European Pat. Off. | H04N 7/167 |
| 426923 | 5/1991 | European Pat. Off. | H04N 7/167 |
| 0426923 | 5/1991 | European Pat. Off. | H04N 7/167 |
| 8914417 | 5/1991 | France | G05K 19/073 |

*Primary Examiner*—Gilberto Barrón, Jr.
*Attorney, Agent, or Firm*—Joseph S. Tripoli; Peter M. Emanuel; Robert D. Shedd

[57] ABSTRACT

In a system for controlling access to signals such as pay-TV signals, the signals include data packets that are received and by a decoder and forwarded to a smart card for access authorization processing. The data packets contain information that updates entitlement or access authorization data inside the smart card. Time-related data is added to the data packets. The smart card checks to determine if the time-related data evolves between two successive packets. If not, the smart card inhibits the delivering of descrambling parameters to the decoder.

20 Claims, 3 Drawing Sheets

APPARATUS AND METHOD FOR ACCESS CONTROL

FIELD OF THE INVENTION

The present invention relates to access control for systems such as pay-tv systems.

BACKGROUND

In a typical pay-tv system such as the VIDEOCRYPT or EUROCRYPT systems, two kinds of data packets are transmitted via a decoder to a "user", e.g. a smart card. A first type of packet, designated ECM in EUROCRYPT systems, contains information which will permit the decoder to descramble signals such as video and/or sound signals. The descrambling data is returned to the decoder in a form that enables descrambling in the decoder only if the user is authorized to access the current program. When the user is represented by a smart card, access authorization is indicated by "entitlement data" stored in the card.

A second type of packet, designated EMM in EUROCRYPT systems, contains information which will update user entitlement data by, for example, modifying data stored in a smart card. Typically, one of two types of entitlement data is stored in a smart card. The first type involves storing the beginning and ending dates of the period during which user access is authorized. The second is simply the current entitlement state, i.e. authorized or not. The first type of data requires more memory and processing time than does the second. It is desirable, therefore, to design a system using the second type of entitlement data.

However, certain security problems are associated with the second type of entitlement data. For example, once an entitlement state is set to "authorized", preventing EMM data from being written to a smart card will prevent the entitlement state from being changed to "unauthorized". In FR-A-8914417, a system of protection against the inhibition of writing in smart cards is described. This system may not provide sufficient security.

SUMMARY OF THE INVENTION

The invention resides in part in recognizing that security problems exist that may not be adequately addressed in known systems. For example, someone attempting to gain unauthorized access, i.e. a "hacker", may develop an approach for distinguishing between ECM and EMM packet types. If so, access security can be attacked by identifying and suppressing EMM packets. Suppressing EMM packets after access is authorized prevents the authorization state from being reset, i.e. disabled. Identification of EMM packets prevents suppression of ECM packets which might cause a loss of descrambling information making it impossible for the decoder to descramble the picture and/or sound.

Assuming the entitlement data is the second type and it is possible to detect EMM packets, a hacker could use one of the following approaches to attack access control. A first attack approach is to discard all EMM packets once the card is authorized to descramble all programs. This makes it impossible to change the entitlement data and unlimited unauthorized access is achieved.

A second attack approach involves the hacker first determining if an EMM packet is directed, i.e. dedicated, to the hacker's smart card. Encryption of data may make the "destination" of a particular packet impossible to determine when the packet is initially received. However, by "eavesdropping", for example monitoring whether the system responds to a packet, the hacker may be able to identify an "inactive" EMM packet, i.e. one that is not dedicated to the particular smart card. It would then be possible to store the inactive packet, discard every subsequent EMM packet, and replace the discarded packets with the inactive packet. This prevents the smart card from receiving EMM packets intended for it and unlimited unauthorized access results.

A third attack approach involves several steps. First, the hacker registers as an official subscriber but does not pay the subscription fee. As a result, the hacker's card is "black listed", i.e. the smart card is configured to prevent delivery of the correct descrambling parameters to the decoder. Next, the hacker requests the card to be "white listed", i.e. authorized. The hacker then records all subsequent transactions between the decoder and the smart card until the smart card is authorized. When the authorization expires, the hacker can replay the authorization sequence (EMM and ECM data) to validate the card.

The invention resides in part in providing a solution to the described access control problems. In accordance with a first aspect of the invention, a smart card must receive at least one EMM packet, whether dedicated to the card or not, during a given period of time. If this requirement is not satisfied, the smart card will not provide the correct parameters (ECM) for descrambling.

In accordance with another aspect of the invention, data that changes, or evolves, over time is added to the EMM packet data. The smart card checks the time-varying data to verify that the data is changing in a particular manner. If the data is not changing appropriately, the smart card inhibits delivery of the descrambling parameters to the decoder.

BRIEF DESCRIPTION OF THE DRAWING

The invention may be better understood by referring to the following detailed description of the drawing in which.

DETAILED DESCRIPTION OF THE DRAWING

Figure 1:
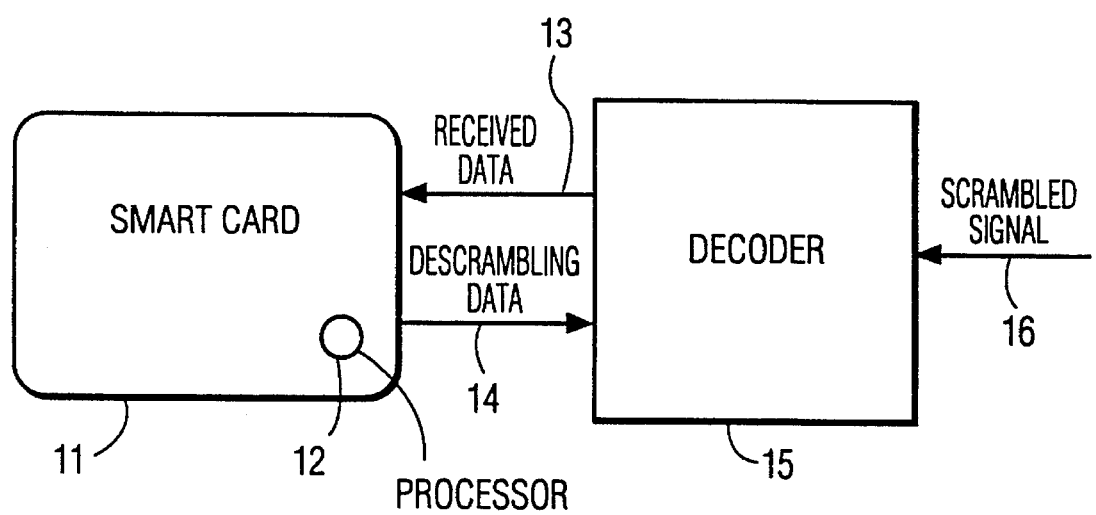
FIG. 1 shows a block diagram of apparatus constructed in accordance with the principles of the present invention.

In FIG. 1, signal 16 includes scrambled video and/or audio signals together with cryptographically protected data. Signal 16 is transmitted via a pay TV decoder 15 to a smart card 11 which contains a memory and microcontroller chip 12. Data 13 contains parameters for descrambling and entitlement updates are sent from decoder 15 to card 11. Processor 12 on card 11 checks the validity of the received data 13 and delivers respective descrambling information 14 to decoder 15. The validity check by processor 12 may be accomplished in accordance with principles of the invention as shown in FIGS. 2 and 3.

Figure 2:
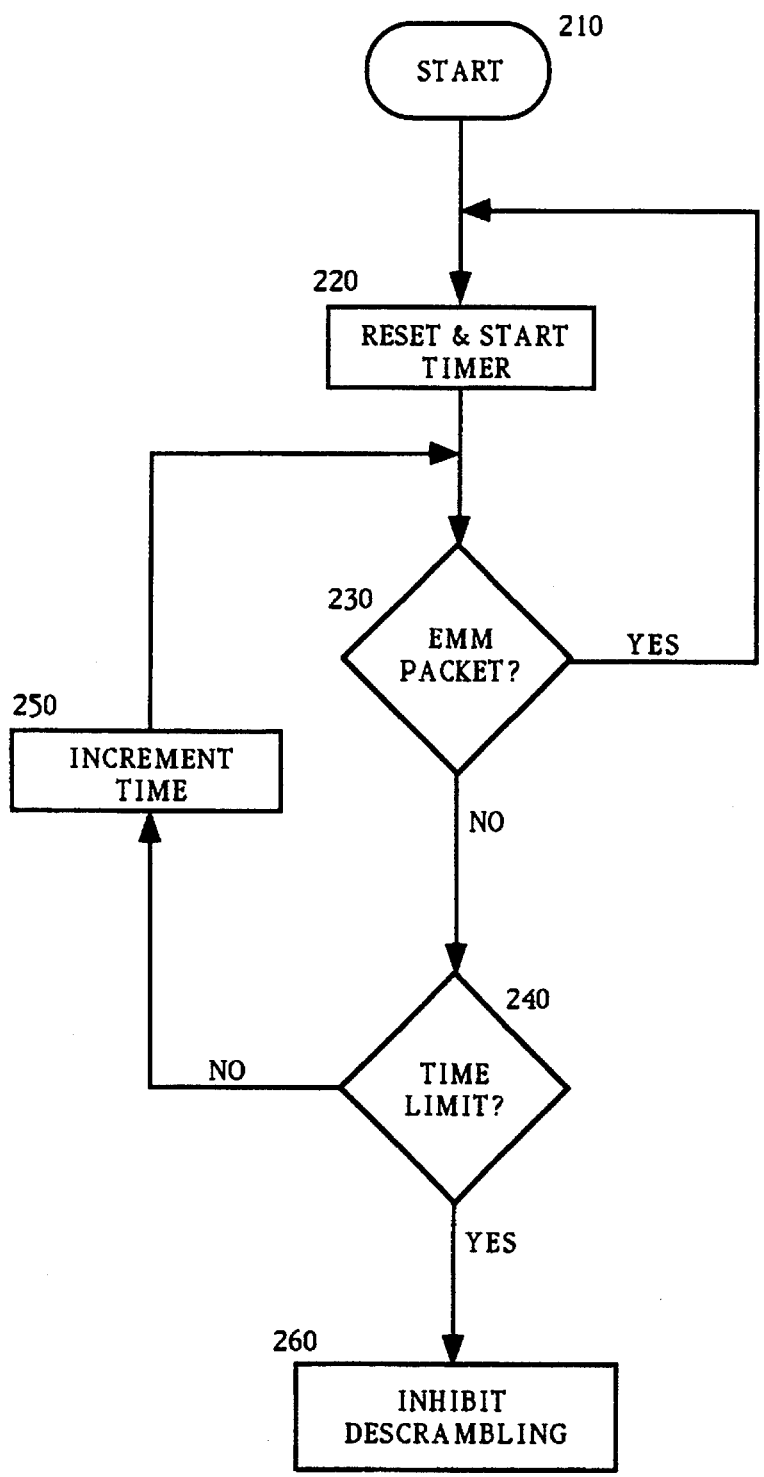
FIGS. 2 and 3 show flowcharts depicting different embodiments of aspects of the invention.

FIG. 2 shows a flow chart of a portion of an access control procedure that provides a countermeasure to the "first attack approach", i.e. suppressing EMM packet data. The operations shown in FIG. 2 may by implemented using a timer feature included in processor 12 in FIG. 1. The timer is reset and begins timing at step 220 in FIG. 2. At step 230, the packet type is checked to determine when an EMM packet is received. If an EMM packet is received, step 220 is executed again to restart the timer. If an EMM packet is not received, the timer value is compared to a time limit value at step 240. The time limit value represents an interval during which an EMM packet should be received if EMM packets are not being suppressed. This interval may be determined by, for example, monitoring the rate of receipt of EMM packets by the smart card during normal operation. If the time limit is not exceeded, the time value is incremented at step 250 and operation continues at step 230 where checking for an EMM packet continues. A timer value that exceeds the time limit at step 240 indicates that EMM packets are being suppressed. As a result, processor 12 in card 11 in FIG. 1 inhibits descrambling at step 260 by, for example, ceasing the transmission of the required descrambling data to decoder 15 in FIG. 1. The card can inhibit descrambling either temporarily or permanently.

Figure 3:
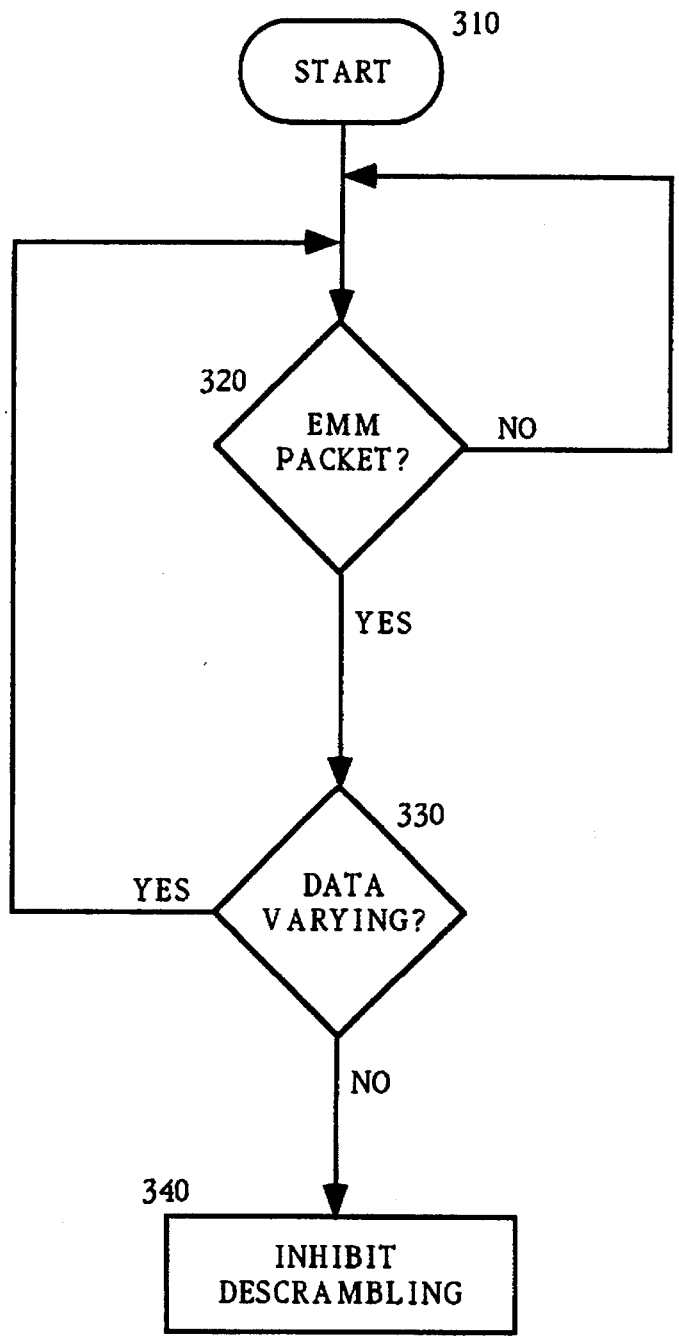

FIG. 3 shows another embodiment for providing a countermeasure to the above-described attack approaches, and in particular the second attack approach. In FIG. 2, processor 12 (FIG. 1) implements an access control procedure starting at step 310 that first involves checking the received packets to identify EMM packets. The approach depicted in FIG. 3 assumes that a data field is included in each valid EMM packet for the purpose of verifying EMM packet validity. For valid EMM packets, the content of this special data field varies in a particular manner at a particular rate. Suppression of EMM packets (first attack approach), insertion of stored "inactive" EMM packets (second attack approach), or storing and repeating a previous access sequence (third attack approach) will not provide the varying EMM data that processor 12 expects. Thus, at step 330 in FIG. 3, processor 12 checks the special data field to determine if the data is varying as expected. If the data is varying, operation continues at step 320 where the next EMM packet is detected. If the data is not varying, invalid EMM data is assumed and descrambling is inhibited at step 340. As described above, descrambling may be inhibited either temporarily or permanently.

The varying data field may be implemented in several ways. First, real time information, for example the number of hundreds of seconds elapsed since midnight, can be included in the EMM packet. Smart card processor 12 will check that this time information has increased between two successive EMM packets.

A second approach is to include in the special data field a portion, for example one byte, of the control parameters used for descrambling. These parameters are delivered by the ECM packets and are random by nature. As a result, the special data is unpredictable from the viewpoint of the hacker which improves security.

A third approach that is particularly useful in regard to the third attack approach is to add time stamp information to the EMM packet. The time stamp information changes slowly, for example incremented once each day. Once the smart card finds an EMM packet dedicated to the card, the card will compare the time stamp information stored in the card with the information in the EMM packet. If the time stamp data exhibits an expected relationship to the stored data, e.g., greater or equal to the data stored in the card, the action is performed and the stored time stamp data is replaced by the new data in the EMM packet. If the relationship is not as expected, the EMM data is presumed to be invalid and descrambling is inhibited.

Various modifications of the described features are possible. For example, in regard to FIG. 2, the timing feature can decrement time from an initial value rather than incrementing as shown in FIG. 2. Also, an alternative approach to FIG. 2 is to count the number of packets that occur during a particular period of time. If an expected number of packets is received, EMM packets are not being suppressed. An expected number of packets can be derived by monitoring packets received by the smart card during a particular interval of normal operation. In addition, the features shown in FIGS. 2 and 3, including the described counting and timing features, may be implemented in hardware, software, or a combination of hardware and software. These and other modifications are intended to be within the scope of the invention as defined by the following claims.

We claim:

1. A method of controlling access to information included in a signal having an entitlement component including entitlement data indicating an access entitlement status of a user, said method comprising the steps of:

receiving said signal in a decoder for decoding a portion of said information in said signal other than said entitlement component in response to an access authorization signal, and for separating said entitlement component from said signal;

transmitting said separated entitlement component from said decoder to a device for establishing access entitlement status of a user in response to said entitlement data;

checking in said device to determine if said entitlement data evolves in a predetermined manner between two occurrences of said entitlement data, wherein said entitlement data includes a copy of a portion of scrambling data included in said signal for establishing said predetermined manner of evolution;

generating in said device said access authorization signal to enable decoding of said portion of said signal only if said entitlement data evolves in said predetermined manner.

2. The method of claim 1 comprising the further steps of:

checking in said device to determine if said entitlement data is received during a predetermined time period;

generating said access authorization signal only if said entitlement data is received during said predetermined time period.

3. The method of claim 1 wherein said entitlement data includes a transcription of the current local time for establishing said predetermined manner of evolution.

4. The method of claim 1 wherein said wherein said device comprises a smart card;

said signal includes scrambled video and/or audio signals together with cryptographically protected data; and said access authorization signal comprises descrambling information for enabling said decoder to decode said scrambled signals.

5. The method of claim 1 wherein said entitlement data includes time information, and said predetermined manner of evolution comprises said time information during a particular occurrence of said entitlement data being not less than said time information during a previous occurrence of said entitlement data.

6. A method of controlling access to information included in a signal having an entitlement component including entitlement data indicating an access entitlement status of a user, said method comprising the steps of:

receiving said signal in a decoder for decoding a portion of said information in said signal other than said entitlement component in response to an access authorization signal, and for separating said entitlement component from said signal;

transmitting said separated entitlement component from said decoder to a device for establishing access entitlement status of a user in response to said entitlement data;

checking in said device to determine if said entitlement data evolves in a predetermined manner between two occurrences of said entitlement data, wherein said predetermined manner of evolution comprises time information during a particular occurrence of said entitlement data being not less than said time information during a previous occurrence of said entitlement data;

generating in said device said access authorization signal to enable decoding of said portion of said signal only if said entitlement data evolves in said predetermined manner.

7. The method of claim 6 wherein said entitlement data includes a transcription of the current local time for establishing said predetermined manner of evolution.

8. The method of claim 6 wherein said entitlement data includes a copy of a portion of scrambling data included in said signal for establishing said predetermined manner of evolution.

9. The method of claim 6, comprising the further steps of:

checking in said device to determine if said entitlement data is received during a predetermined time period;

generating said access authorization signal only if said entitlement data is received during said predetermined time period.

10. The method of claim 6 wherein said device comprises a smart card;

said signal includes scrambled video and/or audio signals together with cryptographically protected data; and said access authorization signal comprises descrambling information for enabling said decoder to decode said scrambled signals.

11. Apparatus for controlling access to information included in a signal having an entitlement component including entitlement data indicating an access entitlement status of a user, said apparatus comprising:

a decoder for receiving said signal, for decoding a portion of said information in said signal other than said entitlement component in response to an access authorization signal, and for separating said entitlement component from said signal; and means coupled to said decoder for receiving said entitlement component and for evaluating said entitlement data to establishing said access entitlement status of said user; wherein said evaluating means generates said access authorization signal only if said entitlement data evolves in a predetermined manner between two occurrences of said entitlement data, and wherein said entitlement data includes a copy of a portion of scrambling data included in said signal for establishing said predetermined manner of evolution.

12. The apparatus of claim 11 wherein said evaluating means generates said access authorization signal only if said entitlement data is received during a predetermined time period.

13. The apparatus of claim 11 wherein said entitlement data includes a transcription of the current local time for establishing said predetermined manner of evolution.

14. The apparatus of claim 11 wherein said evaluating means comprises a smart card;

said signal includes scrambled video and/or audio signals together with cryptographically protected data; and said access authorization signal comprises descrambling information for enabling said decoder to decode said scrambled signals.

15. The apparatus of claim 11 wherein said entitlement data includes time information, and said predetermined manner of evolution comprises said time information during a particular occurrence of said entitlement data being not less than said time information during a previous occurrence of said entitlement data.

16. Apparatus for controlling access to information included in a signal having an entitlement component including entitlement data indicating an access entitlement status of a user, said apparatus comprising:

a decoder for receiving said signal, for decoding a portion of said information in said signal other than said entitlement component in response to an access authorization signal, and for separating said entitlement component from said signal; and means coupled to said decoder for receiving said entitlement component and for evaluating said entitlement data to establishing said access entitlement status of said user; wherein said evaluating means generates said access authorization signal only if said entitlement data evolves in a predetermined manner between two occurrences of said entitlement data, and wherein said predetermined manner of evolution comprises time information during a particular occurrence of said entitlement data being not less than said time information during a previous occurrence of said entitlement data.

17. The apparatus of claim 16 wherein said entitlement data includes a transcription of the current local time for establishing said predetermined manner of evolution.

18. The apparatus of claim 16 wherein said entitlement data includes a copy of a portion of scrambling data included in said signal for establishing said predetermined manner of evolution.

19. The apparatus of claim 16 wherein said evaluating means generates said access authorization signal only if said entitlement data is received during a predetermined time period.

20. The apparatus of claim 12 wherein said evaluating means comprises a smart card;

said signal includes scrambled video and/or audio signals together with cryptographically protected data; and said access authorization signal comprises descrambling information for enabling said decoder to decode said scrambled signals.

* * * * *